(12) United States Patent
Haupt

(10) Patent No.: US 9,702,574 B2
(45) Date of Patent: Jul. 11, 2017

(54) GROUND WATER AIR CONDITIONING SYSTEMS AND ASSOCIATED METHODS

(71) Applicant: Steven B. Haupt, Phoenix, MD (US)

(72) Inventor: Steven B. Haupt, Phoenix, MD (US)

(73) Assignee: Steven B. Haupt, Phoenix, MD (US)

( * ) Notice: Subject to any disclaimer, the term of this patent is extended or adjusted under 35 U.S.C. 154(b) by 412 days.

(21) Appl. No.: 14/272,987

(22) Filed: May 8, 2014

(65) Prior Publication Data

US 2014/0332196 A1    Nov. 13, 2014

Related U.S. Application Data

(60) Provisional application No. 61/855,131, filed on May 9, 2013.

(51) Int. Cl.

| | | |
|---|---|---|
| G05D 23/00 | (2006.01) | |
| F24J 3/08 | (2006.01) | |
| F25D 17/00 | (2006.01) | |
| G05D 23/12 | (2006.01) | |
| G05D 23/02 | (2006.01) | |
| G05D 23/08 | (2006.01) | |
| F24F 7/00 | (2006.01) | |
| F24F 5/00 | (2006.01) | |

(Continued)

(52) U.S. Cl.
CPC ........ *F24F 5/0046* (2013.01); *F24F 11/0012* (2013.01); *F24F 2005/0057* (2013.01); *F24J 3/085* (2013.01); *F28D 1/0478* (2013.01); *F28F 1/32* (2013.01); *Y02E 10/14* (2013.01)

(58) Field of Classification Search
CPC ............... F24F 2001/0077; F24F 5/005; F24F 2005/0057; F28F 27/02; F24J 3/085

USPC .............. 165/45, 289, 299; 4/493, 545, 598; 62/177, 178; 236/49.3, 93 R

See application file for complete search history.

(56) References Cited

U.S. PATENT DOCUMENTS

| | | |
|---|---|---|
| 2,167,878 A | 8/1939 | Crawford |
| 2,279,657 A | 4/1942 | Crawford |
| | (Continued) | |

OTHER PUBLICATIONS

PCT International Search Report dated Sep. 24, 2014 for counterpart PCT/US2014/037333, filed May 8, 2014 (2 pages).

(Continued)

*Primary Examiner* — Justin Jonaitis
*Assistant Examiner* — Paul Alvare
(74) *Attorney, Agent, or Firm* — Mark Malek; Daniel Pierron; Widerman Malek, PL

(57) ABSTRACT

A method of cooling air includes a liquid coolant subsystem including a cool water source configured to hold water, an air cooling subsystem including an air chamber that contains air therein, an air conditioning apparatus including a heat exchanger of a liquid-to-air type having a heat sink in thermal communication, a fan assembly configured to move air along the heat sink of the heat exchanger, a thermostat, a temperature sensor, and a control circuit in electronic communication with the temperature sensor and the thermostat, a plumbing subsystem including an inlet piping component in fluid communication with heat exchanger, an outlet piping component in fluid communication with the exchanger, and a solenoid valve. The control circuit may be configured to activate the fan assembly and to open the solenoid valve, allowing for the transfer heat to water from the air moved by the fan assembly.

10 Claims, 7 Drawing Sheets

(51) Int. Cl.
  *F24F 11/00*   (2006.01)
  *F28D 1/047*   (2006.01)
  *F28F 1/32*   (2006.01)

(56) References Cited

U.S. PATENT DOCUMENTS

| | | | |
|---|---|---|---|
| 2,286,604 A | 6/1942 | Crawford | |
| 2,299,335 A | 10/1942 | McGrath | |
| 2,461,449 A | 2/1949 | Smith et al. | |
| 2,490,983 A | 12/1949 | Smith et al. | |
| 4,240,268 A | 12/1980 | Yuan | |
| 4,325,357 A | 4/1982 | Wormser | |
| 4,402,190 A | 9/1983 | Reid | |
| 4,412,426 A * | 11/1983 | Yuan | F24F 5/0017 165/45 |
| 4,427,055 A | 1/1984 | Heavener | |
| 4,448,237 A | 5/1984 | Riley | |
| 4,577,679 A | 3/1986 | Hibshman | |
| 4,607,169 A | 8/1986 | Donnelly | |
| 4,633,676 A | 1/1987 | Dittell | |
| 4,653,287 A | 3/1987 | Martin | |
| 4,718,248 A | 1/1988 | Fisher | |
| 4,920,757 A | 5/1990 | Gazes et al. | |
| 5,014,770 A | 5/1991 | Palmer | |
| 5,140,829 A | 8/1992 | Barwacz | |
| 5,183,100 A | 2/1993 | Harrell | |
| 5,183,102 A | 2/1993 | Clark | |
| 5,372,016 A | 12/1994 | Rawlings | |
| 5,975,192 A | 11/1999 | Moratalla et al. | |
| 6,109,339 A | 8/2000 | Talbert et al. | |
| 6,138,744 A | 10/2000 | Coffee | |
| 7,412,838 B2 | 8/2008 | Hamanaka et al. | |
| 7,712,326 B2 | 5/2010 | Jagusztyn et al. | |
| 8,376,030 B2 | 2/2013 | Jatkar | |
| 2002/0108393 A1 | 8/2002 | Schulak | |
| 2004/0035552 A1 | 2/2004 | Xu | |
| 2006/0168979 A1 | 8/2006 | Kattner | |
| 2007/0017243 A1 | 1/2007 | Kidwell et al. | |
| 2007/0023164 A1 | 2/2007 | Kidwell et al. | |
| 2007/0068184 A1 * | 3/2007 | Mueller | F24D 15/04 62/260 |
| 2007/0079953 A1 | 4/2007 | Liao et al. | |
| 2007/0084939 A1 * | 4/2007 | Liu | B64D 13/00 236/91 D |
| 2007/0130963 A1 | 6/2007 | Morrison et al. | |
| 2007/0245759 A1 | 10/2007 | Sedlak et al. | |
| 2007/0266722 A1 | 11/2007 | McCaughan | |
| 2008/0115515 A1 | 5/2008 | Bailey et al. | |
| 2008/0149301 A1 * | 6/2008 | Jatkar | F24D 12/02 165/45 |
| 2009/0019876 A1 | 1/2009 | Guglietti et al. | |
| 2009/0321041 A1 | 12/2009 | Hammond | |
| 2010/0089387 A1 | 4/2010 | Roseberry | |
| 2010/0200210 A1 | 8/2010 | Gian | |
| 2010/0236266 A1 | 9/2010 | Skidmore | |
| 2010/0294456 A1 | 11/2010 | Taraba | |
| 2010/0300645 A1 | 12/2010 | Glover | |
| 2011/0308268 A1 | 12/2011 | Krimsky | |
| 2012/0090807 A1 | 4/2012 | Stewart et al. | |
| 2012/0318474 A1 | 12/2012 | Lieskoski | |

OTHER PUBLICATIONS

PCT Written Opinion of the International Searching Authority completed Sep. 1, 2014 for counterpart PCT/US2014/037333, filed May 8, 2014 (11 pages).

* cited by examiner

GROUND WATER AIR CONDITIONING SYSTEMS AND ASSOCIATED METHODS

RELATED APPLICATIONS

This application claims the benefit under 35 U.S.C. §119(e) of U.S. Provisional Patent Application Ser. No. 61/855,131 filed on May 9, 2013 and titled Ductless Air Conditioner, the entire contents of which are incorporated herein by reference.

FIELD OF THE INVENTION

The present invention relates to the field of air conditioning and, more specifically, to the field of using a naturally-occurring water temperature difference to condition air, and associated systems and methods.

BACKGROUND

Air conditioning systems are pervasive throughout industrialized nations for providing cooling to enclosed interior areas. Traditional cooling systems utilize refrigeration cycles requiring significant expenditure of electrical power, driving down the efficiency of such systems. Moreover, systems relying on such refrigeration cycles are expensive to produce and maintain, and often include the use of materials that are environmentally unfriendly and must be carefully isolated from the environment.

The use of natural sources of cool water in cooling systems has been demonstrated. In U.S. Pat. No. 2,299,335 to McGrath, using well water in a cooling system. However, the disclosure of McGrath requires the use of a compressor in conjunction with the well water, which then runs through a cooling coil. The use of the compressor reduces the energy efficiency of the cooling system. Moreover, McGrath is directed to controlling the temperature of a cooling fluid used for cooling purposes, which serves to substantially increase the number of components necessary as well as increasing the cost of the system. Other systems known in the art have similar shortcomings.

Accordingly, there exists a need for a cooling system that does not require the use of expensive or energy-inefficient components while still achieving sufficient cooling capability.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a ground water air conditioning system design which uses cool well water (typically 55 degrees Fahrenheit) routed through a heat exchanger to cool air inside a dwelling. The system advantageously uses less electricity due, in part, to utilizing a liquid coolant that is already at a suitable temperature that is usable for cooling purposes. Additionally, the system may be safer by utilizing a lower amperage of electricity and not relying on the usage of environmentally unfriendly materials in a refrigeration process. Furthermore, the system does not require duct work, window mounting, the use of compressors, nor recharging of materials used in a refrigeration process.

Furthermore, embodiments of the prevent invention are related to a cooling system comprising a liquid coolant subsystem comprising a cool water source configured to hold water, an air cooling subsystem comprising an air chamber that contains air therein, and an air conditioning apparatus comprising a heat exchanger of a liquid-to-air type having a tube that includes an inlet orifice, an outlet orifice, an interior surface, and an exterior surface, and having a heat sink in thermal communication with the exterior surface of the tube. The air cooling subsystem may further comprise a fan assembly comprising a fan configured to move a volume of the air contained within the air chamber along the heat sink of the heat exchanger and back into the air chamber, a thermostat configured to receive a set point temperature, a temperature sensor configured to measure a temperature of the air contained in the air chamber, and a control circuit in electronic communication with the temperature sensor and the thermostat and configured to compare the temperature of the air in the air chamber to the set point temperature.

The cooling system may further comprise a plumbing subsystem comprising an inlet piping component in fluid communication with the inlet orifice and configured to deliver a volume of the water held by the cool water source to the tube of the heat exchanger, an outlet piping component in fluid communication with the outlet orifice and configured to discharge the volume of the water from the tube of the heat exchanger, and a solenoid valve located on the inlet piping component upstream of the heat exchanger and downstream of the cool water source. The control circuit may be configured to control operation of the fan assembly and of the solenoid valve. Furthermore, upon detection that the set point temperature is less than the temperature of the air in the air chamber, the control circuit may be configured to activate the fan assembly and to open the solenoid valve, thereby allowing the volume of the water to pass along the interior surface of the tube of the heat exchanger, and to transfer heat to the volume of the water from the volume of the air moved by the fan assembly along the heat sink of the heat exchanger.

In some embodiments, the cool water source is positioned underground at a vertical depth of not less than 40 feet. Furthermore, a temperature of the water held by the cool water source may be less than or equal to 55 degrees Fahrenheit. In some embodiments, the cool water source may comprise at least one of an underground tank and an aquifer.

The fan assembly and the solenoid valve may be configured to operate on 120 VAC power. Furthermore, the system may further comprise a power supply assembly comprising a power supply circuit and a power switch configured to selectively apply the 120 VAC power to the fan assembly and to the solenoid valve. Additionally, the liquid coolant subsystem, the air cooling subsystem, and the plumbing subsystem may be configured to operate at an energy efficiency ratio of not less than 45.

In some embodiments the piping subsystem may further comprise a water flow rate valve located on the inlet piping component upstream of the heat exchanger and downstream of the solenoid valve, and configured to adjustably regulate a rate at which the volume of the water is allowed to pass from the solenoid valve to the heat exchanger. Moreover, the piping subsystem may further comprise a shutoff valve located on the inlet piping component upstream of the solenoid valve, and configured to selectively stop the volume of the water from passing to the solenoid valve.

In some embodiments, upon detection that the set point temperature is equal to the temperature of the air in the air chamber, the control circuit may be configured to deactivate the fan assembly and to close the solenoid valve. Furthermore, the outlet piping component may be configured to discharge the volume of the water from the tube of the heat exchanger to a location that is outside of the air chamber and is not in fluid communication with the cool water source.

Additionally, embodiments of the present invention are directed to a method of cooling air contained in an air chamber using a cool water source configured to hold water having a first temperature. The method may comprise the steps of receiving a set point temperature using a thermostat, measuring a second temperature of the air contained in the air chamber using a temperature sensor, comparing the set point temperature to the second temperature of the air in the air chamber using a control circuit in electronic communication with the temperature sensor and with the thermostat, detecting that the set point temperature is less than the second temperature using the control circuit. Furthermore, the method may further comprise the steps of delivering, using an inlet piping component, a first volume of the water held by the cool water source to a heat exchanger of a liquid-to-air type having a tube that includes an inlet orifice, an outlet orifice, an interior surface, and an exterior surface, and having a heat sink in thermal communication with the exterior surface of the tube, passing the first volume of the water through the inlet orifice and along the interior surface of the tube of the heat exchanger, wherein the inlet piping component is in fluid communication with the inlet orifice. Additionally, the method may further comprise the steps of moving a first volume of the air contained by the air chamber along the heat sink of the heat exchanger using a fan that is operably coupled to the control circuit, transferring heat to the first volume of the water from the first volume of the air, thereby altering the first volume of the air to exhibit a first-cycle conditioned temperature that is less than the second temperature and altering the first volume of the water to exhibit a first-cycle altered temperature that is greater than the first temperature and that approximately equals the first-cycle conditioned temperature, and moving the first volume of the air having the first-cycle conditioned temperature back into the air chamber.

In some embodiments, the step of delivering the first volume of the water to the heat exchanger further may comprise opening a solenoid valve to allow the inlet piping component to deliver the first volume of water to the heat exchanger. The solenoid may be operably coupled to the control circuit and is located on the inlet piping component upstream of the heat exchanger and downstream of the cool water source. Furthermore, the method may further comprise the step of comprising selectively stopping the first volume of the water from passing to the solenoid valve using a shutoff valve located on the inlet piping component upstream of the solenoid valve.

In some embodiments, the step of moving the first volume of the air further comprises operating the fan. Furthermore, operating the fan and operating the solenoid valve, in combination, may be characterized by an energy efficiency ratio not less than 45. Additionally, the step of delivering the first volume of the water to the heat exchanger may further comprise adjustably regulating a rate at which the first volume of the water is allowed to pass from the solenoid valve to the heat exchanger using a water flow rate valve located on the inlet piping component upstream of the heat exchanger and downstream of the solenoid valve.

In some embodiments, the method may further comprise the steps of measuring a third temperature of the air contained in the air chamber using the temperature sensor, comparing the set point temperature to the third temperature using the control circuit, detecting whether the third temperature is equal to or less than the set point temperature using the control circuit, closing the solenoid valve in response to a close signal received from the control circuit, and stopping at least one fan in response to a stop signal received from the control circuit. Furthermore, the method may comprise the steps of passing the first volume of the water along the interior surface of the tube of the heat exchanger and through the outlet orifice, discharging, using an outlet piping component, the first volume of the water from the tube of the heat exchanger, wherein the outlet piping component is in fluid communication with the outlet orifice, delivering, using the inlet piping component, a second volume of the water held by the cool water source to the heat exchanger, and passing the second volume of the water through the inlet orifice and along the interior surface of the tube of the heat exchanger. The method may further comprise the steps of moving a second volume of the air contained by the air chamber along the heat sink of the heat exchanger using the at least one fan, transferring heat to the second volume of the water from the second volume of the air, thereby altering the second volume of the air to exhibit a second-cycle conditioned temperature that is less than the third temperature and altering the second volume of the water to exhibit a second-cycle altered temperature that is greater than the first temperature and that approximately equals the second-cycle conditioned temperature, and moving the second volume of the air having the second-cycle conditioned temperature back into the air chamber.

DETAILED DESCRIPTION OF THE INVENTION

Figure 1:
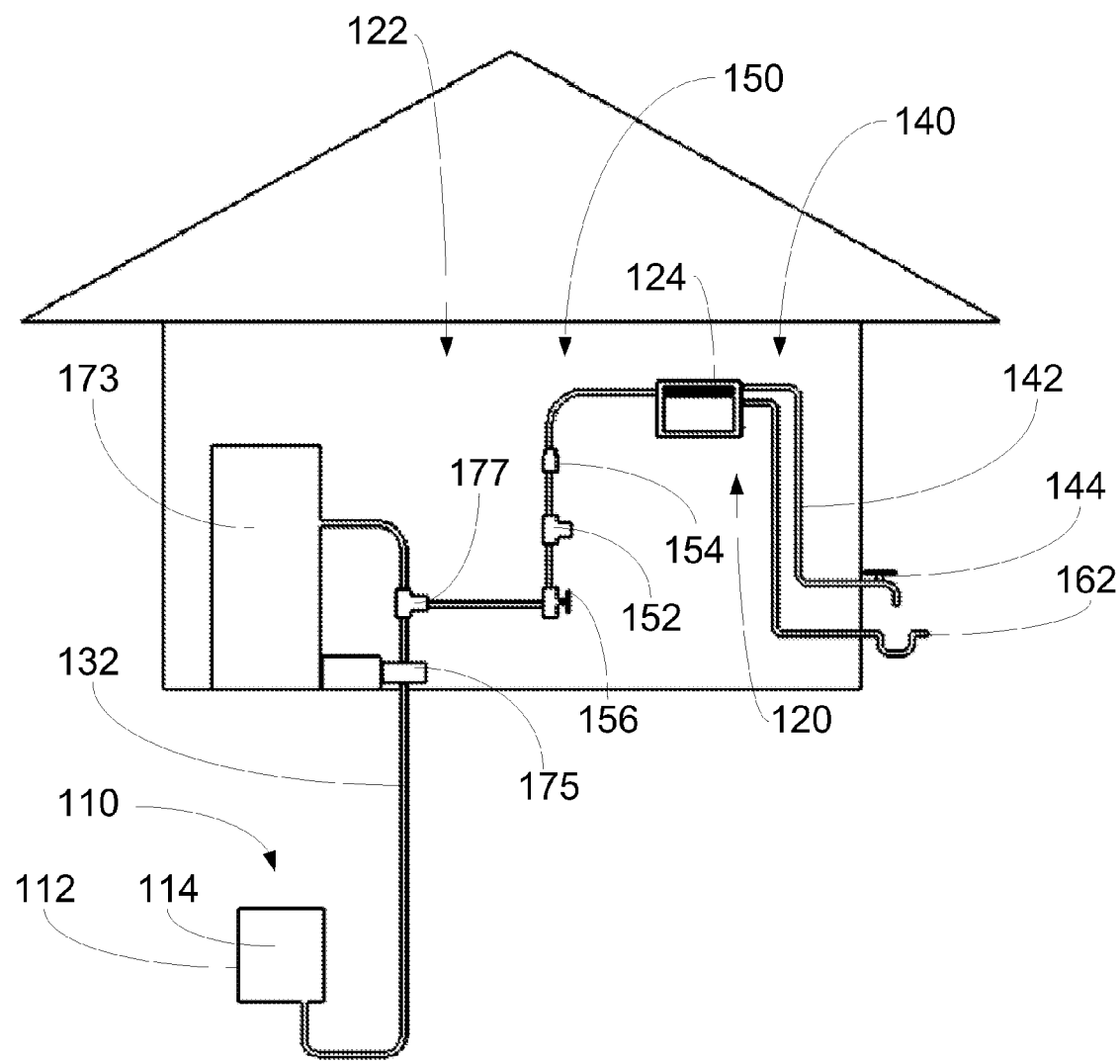
FIG. 1 is a schematic block diagram of a ground water air conditioning system configured for cooling according to an embodiment of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Additionally, in this detailed description, it is contemplated that wherever the terms "comprising" or "including" are used in describing various elements and parts of the invention, and indeed the invention itself, connoting that additional elements may be included within the scope of the invention, such terms may be understood to mean in the alternative that the invention or referenced element may consist solely of those elements recited. According to such alternative embodiments, the invention may be understood to include only those elements recited.

An embodiment of the invention text, as shown and described by the various figures and accompanying text provides a cooling system that utilizes well water to provide primary or supplemental cooling. The cooling system may advantageously accomplish cooling with comparatively fewer parts than traditional well-water cooling systems. The cooling system may be used as a stand-alone cooling system, or it may be used to augment an existing cooling system.

Referring now to FIG. 1, a cooling system 100 according to an embodiment of the invention is presented. The cooling system 100 may comprise, or, in some embodiments, consist of a liquid coolant subsystem 110, an air cooling subsystem 120, a plumbing subsystem 140, and a control subsystem 150.

The liquid coolant subsystem 110 may be configured to access a reservoir of a cool liquid and to provide the cool liquid for use in the cooling system 100. In the present embodiment, the liquid coolant system 110 may comprise a well subsystem 112. The well subsystem 112 may include a cool water source 114, and may be configured to enable the liquid coolant subsystem 110 to deliver water from the cool water source 114 to relevant elements of the cooling system 100. In the present embodiment, the cool water source 114 may be a reservoir of well water. The cool water source may be a reservoir of cool water of any volume and at any depth that is sufficient to provide water of a sufficiently low temperature so as to be utilized by the cooling system 100.

In the present embodiment, the cool water source 114 may be a reservoir having a depth of at least about 80 feet. In some embodiments, the cool water source 114 may be a reservoir having any depth of at least about 40 feet. The provided depths are exemplary only, and any other depth that may provide sufficiently cool water is contemplated and included within the scope of the invention. It is contemplated and included within the scope of the invention that the liquid coolant subsystem 110 may further comprise other elements as are known in well water pumping systems, including a well pump 175, a check valve 177, a pressure switch, and a captive air tank 173.

The air cooling subsystem 120 may be configured to cooperate with the liquid coolant subsystem 110 and the plumbing system 140 in the operation of the system 100. More specifically, the air cooling subsystem 120 and be configured to receive liquid coolant from the liquid coolant subsystem 110, as delivered by the plumbing system 140, and utilize the liquid coolant so as to accomplish a cooling procedure for use in an air chamber. The air cooling subsystem 120 may include an air chamber 122 that contains air therein and an air conditioning apparatus 124.

Figure 2:
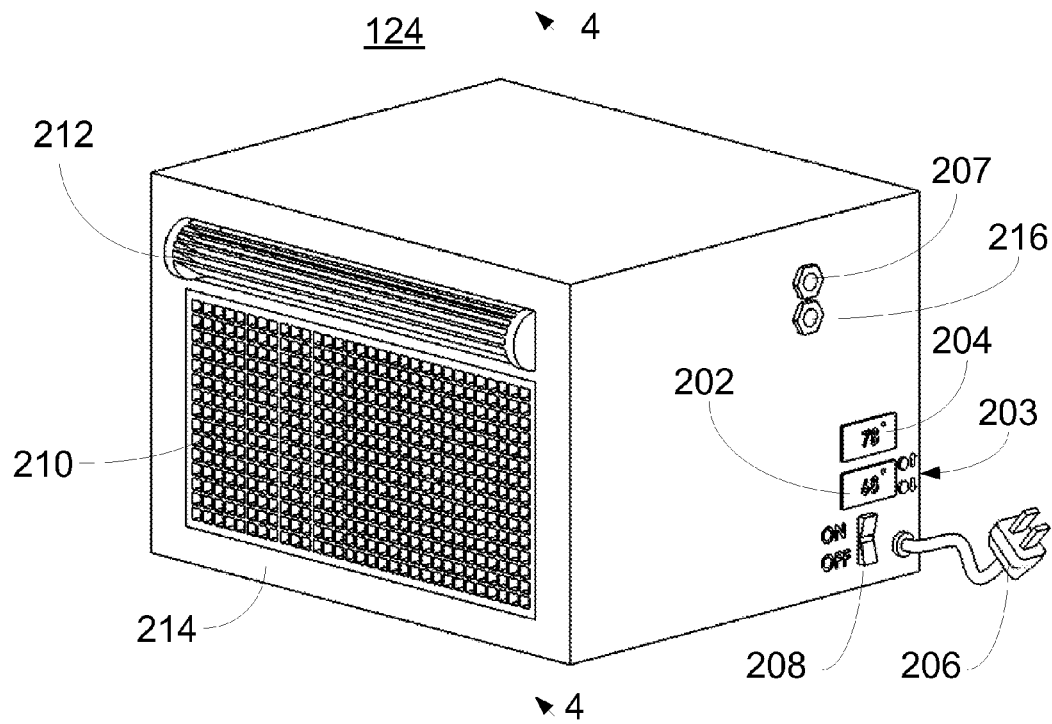
FIG. 2 is an assembled, perspective view of an air conditioning device as used in a ground water air conditioning system according to an embodiment of the present invention.
Figure 3:
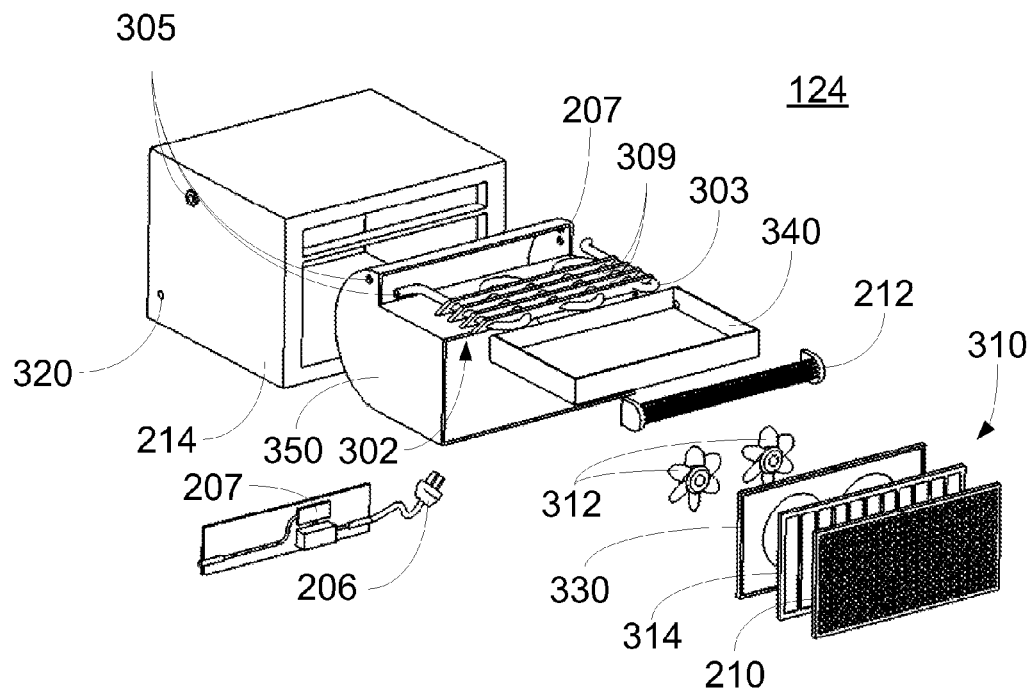
FIG. 3 is an exploded perspective view of the air conditioning device illustrated in FIG. 2.
Figure 4:
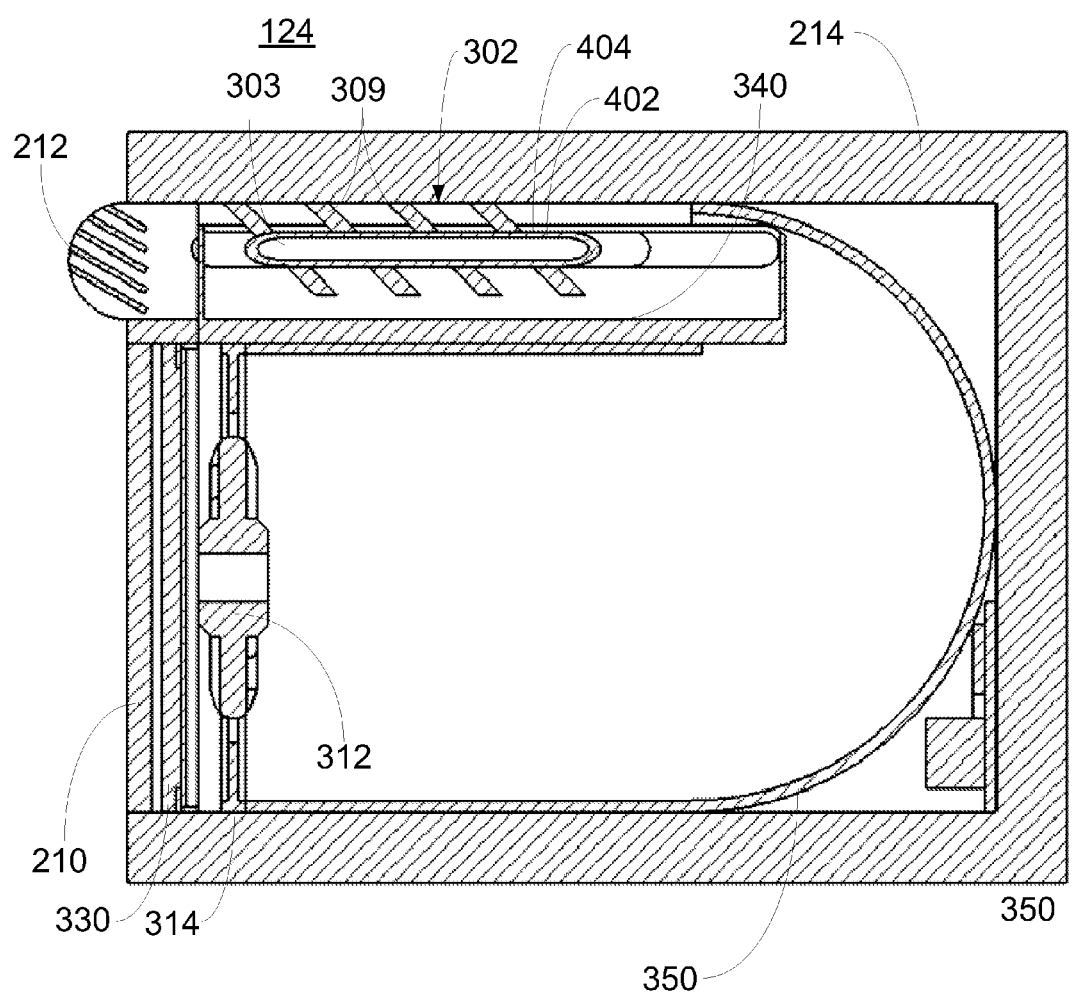
FIG. 4 cross-sectional view of the air conditioning device illustrated in FIG. 2 taken through 4-4.

Referring now to FIGS. 2-4, additional aspects of the air conditioning apparatus 124 will now be discussed in greater detail. The air conditioning apparatus 124 may include a heat exchanger 302. The heat exchanger may be configured to enable and facilitate the dissipation of heat from air surrounding the heat exchanger 302 to a liquid coolant, thereby defining the heat exchanger 302 as a liquid-to-air type. Accordingly, the heat exchanger 302 may be configured to be positioned in fluidic communication with a liquid coolant source.

As in the present embodiment, the heat exchanger 302 may include a tube 303 that includes an inlet orifice 305 and an outlet orifice 207. Furthermore, the tube 303 may further include an interior surface 402 and an exterior surface 404. The interior surface 402 may be configured to facilitate the flow of heat towards a cooling liquid adjacent to the interior surface 402. Furthermore, the interior surface 402 may be configured to facilitate the flow of a liquid coolant therefrom. Additionally, the exterior surface 404 and be configured to facilitate the flow of heat from air surrounding the exterior surface 404 into and through the exterior surface 404 towards the interior surface 402.

The inlet orifice 305 may be positioned on an exterior of the air conditioning apparatus 124 and configured to couple to and establish fluidic communication with a liquid coolant source. Furthermore, the inlet orifice 305 may enable the flow of a liquid coolant to the tube 303.

The outlet orifice 207 may be positioned on an exterior of the air conditioning apparatus 124 and configured to couple to and establish fluidic communication with an outlet for transporting liquid coolant that has flowed through the tube 303 and is exiting therefrom. The outlet may transport the liquid coolant from the air conditioning apparatus 124 to a discharge location for the liquid coolant.

In some embodiments, the tube 303 may further include a secondary outlet orifice 216. The secondary outlet orifice 216 may similarly be positioned on an exterior of the air conditioning apparatus 124 and configured to couple to and establish fluidic communication with another outlet separate and apart from the outlet associated with the outlet orifice 207 for transporting liquid coolant that has flowed through the tube 303 and is exiting therefrom. The outlet associated with the secondary outlet orifice may transport the liquid coolant from the air conditioning apparatus 124 to a discharge location for the liquid coolant.

Furthermore, the heat exchanger 302 may further include a heat sink 309. The heat sink 309 may be positioned in thermal communication with the exterior surface 404 of the tube 303. The heat sink 309 may be configured to facilitate the flow of heat from air flowing thereby in coming into contact with the heat sink 309 into the tube 303, more specifically, the exterior surface 404. For example, in the current embodiment, the heat sink 309 may include a plurality of fins configured to increase the surface area thereof, thereby increasing the thermal flow capacity thereof. Accordingly, the thermal cooperation between the heat sink 309, the exterior surface 404, and the interior surface 402 may facilitate the flow of thermal energy from the air surrounding each of the tube 303 in the heat sink 309 to a liquid coolant.

In some embodiments, the air conditioning apparatus 124 may include an air output section 212. The air output section 212 may be configured and positioned so as to enable air that has flowed over and past the heat exchanger 302 out of the air conditioning apparatus 124 and into the air chamber 122. Generally, the air that flows through the air output section 212 will be cooler than the air in the air chamber 122. In the present embodiment, the air output section 212 comprises a plurality of vents. Furthermore, the air output section 212 may be configured to control the flow of air exiting the air conditioning apparatus so as to direct the flow of air therefrom. In the present embodiment, the air output section 212 may direct the flow of air therefrom in a generally upwards direction. Furthermore, the air output section 212 may be rotatable so as to control the direction of air flowing therefrom.

Additionally, the air conditioning apparatus 124 may further include a fan assembly 310. The fan assembly 310 may be configured to operate so as to generate a fluid flow such that the fluid flow is incident upon at least one of the exterior surface 404 in the heat sink 309 of the heat exchanger 302. More specifically, the fan assembly 310 may be configured to generate a fluid flow of air through a redirection chamber 350. The redirection chamber 350 may be configured to redirect the flow of air generated by the fan assembly 310 in the direction of the heat exchanger 302 and out of the air conditioning apparatus 124. The fan assembly 310 may include at least one fan 312. In the present embodiment, the fan assembly 310 may include two fans. The fan 312 may be configured to move a volume of the air such that the volume of air passes through the redirection chamber 350 and is incident upon and flows across the heat exchanger 302. Additionally, the fan 312 may be positioned so as to draw air from the air chamber 122, thereby causing the air drawn from the air chamber 122 to be incident upon the heat exchanger 302, thereby facilitating the transfer of heat from the air chamber 122 to the heat exchanger 302.

The fan 312 may be configured to operate at a variety of speeds, such that the volume of air moved thereby may be controlled by the operational speed thereof. This may have the effect of varying the cooling rate of the air conditioning apparatus 124. The cooling rate of the air conditioning apparatus 124 may be controlled at least partially by the operational speed of the fan 312.

The fan assembly 310 may further include an air intake grille 210. The air intake grille 210 may be positioned in between the fan 312 and the air chamber 122. Additionally, the air intake grille 210 may be configured to position the fan 312 in fluidic communication with the air chamber 122, thereby enabling the fan 312 to draw air from the air chamber 122. The air intake grille 210 may be configured to include structures and/or material restricting the ability of foreign objects to pass therethrough. For example, in the present embodiment, the air intake grille 210 may comprise a plurality of crossing slats that form a plurality of apertures therebetween, permitting air to flow therethrough while preventing objects having a dimension greater than a dimension of the apertures from being drawn into the air conditioning apparatus 124.

In some embodiments, the fan assembly 310 may include a filter 314. The filter 314 may be configured to prevent or decrease the passage of contaminants therethrough, including common contaminants as are known in enclosed spaces, such as dust, pollen, pet dander, smoke particulate matter, and the like. Any type of filter as is known in the HVAC industry is contemplated and included within the scope of the invention, and may be employed by the air intake grille 210.

In some embodiments, the air conditioning apparatus 124 may include a control circuit, a thermostat 202 positioned in electrical communication with the control circuit, and a temperature indicator 204 positioned in electrical communication with the control circuit. The control circuit may be positioned in operational communication with the fan assembly 310 so as to control the operation thereof. The thermostat 202 may include a display configured to indicate the temperature to which the thermostat may operate the fan assembly 310 to cool the air in the air chamber 122. Additionally, the thermostat 202 may include an input device 203 configured to enable a user to change a set point temperature to which the thermostat 202 cools. A user may operate the input device to select the set point temperature to which the user desires the air chamber 122 to be cooled. Furthermore, the thermostat 202 may be configured to provide the set temperature to the control circuit, which may then operate at least the fan assembly 310 responsive to the set point temperature. In the present embodiment, the input device 203 may include two buttons to raise or lower the set point temperature to which the thermostat 202 will cool the air chamber 122.

Additionally, the control circuit may be positioned in functional communication with an element of a liquid coolant supply system to control the flow of liquid coolant into the air conditioning apparatus 124, thereby enabling a mode of controlling the operation of the air conditioning apparatus 124 so as to only utilize a volume of liquid coolant at a flow rate as is necessary to achieve the temperature set by a user using the input device 203.

In some embodiments, the air conditioning apparatus 124 may further include a temperature sensor 320. The temperature sensor 320 may be configured to measure the ambient air temperature of the air chamber 122 and send the measured temperature to the control circuit, which may then operate at least one of the fan assembly 310 and a liquid coolant supply system to cool the air chamber 122 responsive thereto. The temperature indicator 204 may indicate the measured temperature to a user. In the present embodiment, the temperature indicator 204 may be a display.

The air conditioning apparatus 124 may include a power cord 206. The power cord 206 may be configured to electrically couple to a power source and may further be electrically coupled to the various electrical elements of the air conditioning apparatus 124, including, but not limited to, the control circuit, the thermostat 202, the temperature indicator 204, and the fan assembly 310. In some embodiments, each of the electrical components of the air conditioning apparatus 124 may include circuitry capable of conditioning electricity received from the power cord 206 for use thereby. In other embodiments, a single power supply circuit 207 may be positioned in electrical communication with the power cord 206 and some or all of the electrical components of the air conditioning apparatus 124 and may be configured to condition electricity received from the power cord 206 for use by the various electrical components of the air conditioning apparatus 124. Additionally, in some embodiments, the air conditioning apparatus 124 may include a power switch 208 which may be configured to enable the supply of electricity from the power cord 206 when in a first position and to interrupt the supply of electricity when in a second position. In some embodiments, the fan assembly may be configured to operate using 120 VAC electrical power.

The air conditioning apparatus 124 may further include a first air flow blocking member 330. The first air flow blocking member 330 may be positioned so as to generally prevent the backflow of air through the air intake grille 210 into the air chamber 122. More specifically, the first air flow blocking member may be positioned so as to generally circumscribe the fan 312, preventing air from flowing around the fan 312 when the fan 312 is operating. By preventing such a backflow, all air that is moved by the fan 312 must exit the air conditioning assembly 124 through the air output section 212.

In some embodiments, the air conditioning apparatus 124 may further comprise a second air flow blocking member 340. The second air flow blocking member 340 may be positioned so as to facilitate the flow of air that has flowed across the heat exchanger 302 to exit the air conditioning apparatus 124 through the air output section 212. More specifically, the second air flow blocking member 340 may prevent air that has flowed across the heat exchanged 302 and exchanged thermal energy therewith from flowing down into the redirection chamber 350. This may reduce the turbulence of the flow of air through the air conditioning apparatus 124.

Furthermore, the air conditioning apparatus 124 may include a housing 214. The housing 214 may be configured to carry all the various components of the air conditioning apparatus 124. Additionally, the housing 214 may include openings configured to enable the intake and output of air from the air chamber 122, the inflow and outflow of liquid coolant, and the positioning of the thermostat 202 and its various components so as to be usable by a user. In the present embodiment, the housing 214 may be 24 inches wide, 10 inches deep, and 12 inches tall. These dimensions are exemplary only, and any dimensions which enable the housing 214 to carry the various components of the air conditioning apparatus 124 are contemplated and included within the scope of the invention. Additionally, the housing 214 may be formed of light gauge steel. However, such a material is exemplary only, and the housing 214 may be formed of any material which is suitable for carrying the various components of the air conditioning apparatus 124. Furthermore, the housing 214 may be configured so as to be positioned within the air chamber 122 at a desired location. For example, the housing 214 may be configured so as to be attachable to a wall, ceiling, or any other structure associated with the air chamber 122.

The plumbing subsystem 150 may be configured to facilitate the transportation of liquid coolant accessed by the liquid coolant subsystem 110 to various elements of the cooling system 100. Accordingly, the plumbing subsystem 150 may be positioned in fluidic communication within at least a portion of the liquid coolant subsystem 110 so as to enable transportation of the liquid coolant. Accordingly, the plumbing subsystem 150 may include piping components. The piping components may enable the transportation of the liquid coolant while preventing the unintentional spilling of the liquid coolant. In some embodiments, the piping components may be formed of 2"×2" aluminum finned ¾" copper pipe. Such a piping component is exemplary only, and any suitable type of pipe may be used.

In the present embodiment, the plumbing subsystem 150 may include an inlet piping component 132. The inlet piping component 132 may be positioned in fluidic communication with an element of the air cooling subsystem 120 so as to enable delivery of liquid coolant thereto. More specifically, in the present embodiment, the inlet piping component 132 may be configured to deliver a volume of water held by the cool water source 114, or deliver water at up to a maximum flow rate, to the air cooling subsystem 120. More specifically, the inlet piping component 132 may be configured to deliver water to the inlet orifice 305 for use in the heat exchanger 302 of the air conditioning apparatus 124.

Additionally, in some embodiments, the inlet piping component 132 may include a shutoff valve 156. The shutoff valve 156 may be positioned so as to be operable to interrupt the flow of liquid coolant to the air cooling subsystem 120. More specifically, as in the present embodiment, the shutoff valve 156 may be positioned downstream of the cool water source 114 and upstream of the air cooling subsystem 120 and be operable so as to prevent the flow of water from the cool water source 114 to the air cooling subsystem 120. The shutoff valve 156 may be any type of valve as is known in the art, including, but not limited to, ball valves, butterfly valves, plug valves, globe valves, gate valves, and the like.

Additionally, in some embodiments, the plumbing system 150 may further include a solenoid valve 152. Similar to the shutoff valve 156, the solenoid valve 152 may be positioned so as to be operable to trip the flow of liquid coolant to the air cooling subsystem 120. In the present embodiment, the solenoid valve 152 may be positioned downstream of the cool water source 114 and upstream of the air cooling subsystem 120 and be operable so as to prevent the flow of water from the cool water source 114 to the air-conditioning system 120. Furthermore, in the present embodiment, the solenoid valve 152 is positioned downstream of the shutoff valve 156 and the air cooling subsystem 120. The solenoid valve 152 may be any type of solenoid valve as is known in the art. Additionally, the solenoid valve 152 may be positioned in electrical communication with the control circuit that may control the operation of the solenoid valve 152. Additionally, the solenoid valve 152 may be positioned in electrical communication with the power cord 206 and may operate using electrical power supplied therefrom. Moreover, in some embodiments, the solenoid valve 152 may be configured to operate using 120 VAC electrical power. Through the combined operation of the solenoid valve 152 and the fan apparatus 310, the control circuit may be characterized as achieving a particular energy efficiency ratio of the output cooling in BTUs to the input electrical power in Watt-hours. The ratio is typically calculated using a 95° F. outside temperature and an inside temperature of 80° F. and 50% relative humidity. The cooling system 100 may be characterized by an energy efficiency ratio of at least 45.

Additionally, the plumbing system 150 may include a water flow rate valve 154. The water flow rate valve 154 may be positioned so as to affect the flow rate of cooling liquid to the air cooling subsystem 120. More specifically, the water flow rate valve 154 may be positioned downstream of the cool water source 114 and upstream of the air-conditioning some system 120 and be operable so as to affect the flow rate of water from the cooler source 114 to the air cooling subsystem 120. In the present embodiment, the water flow rate valve 154 is positioned intermediate the solenoid valve 152 and the air cooling subsystem 120. In some embodiments, the water flow rate valve 154 may be configured to have a maximum flow rate of one gallon per minute.

Furthermore, as in the present embodiment, the plumbing subsystem 150 may include an outlet piping component 162. The outlet piping component 162 may be positioned in fluidic communication with an element of the air cooling subsystem 120 so as to enable the discharge of liquid coolant therefrom. More specifically, in the present embodiment, the outlet piping component 162 may be configured to discharge the volume of water previously delivered to the air cooling subsystem 120 by the inlet piping component 132, or discharge water at up to a maximum discharge rate, from the air cooling subsystem 120. More specifically, the outlet piping component 162 may be positioned in fluidic communication with the outlet orifice 207 of the air conditioning apparatus 124 and may be configured to deliver water therefrom to be discharged.

In some embodiments, the outlet piping component 134 may be routed so as to discharge water outside a structure associated with the cooling system 100. The outlet piping component 134 may be routed so as to minimize or eliminate any chance of water being discharge therefrom to be immediately reintroduced to the cool water source 114 prior to reaching a temperature approximately equal to the temperature of water contained by the cool water source 114.

Additionally, in some embodiments, the plumbing subsystem 150 may include a secondary outlet piping component 142. The secondary outlet piping component 142 may be configured so as to enable the use of coolant that has been discharged from the air conditioning apparatus 124 for a subsequent purpose. In the present embodiment, the secondary outlet piping component may include a faucet 144 which may the control of water therethrough. The faucet 144 may be operated so as to allow water discharged from the air conditioning apparatus 124 to be selectively discharged by a user, for example, in an irrigation system. Any type of faucet 144 as is known in the art is contemplated and included within the scope of the invention. Furthermore, the secondary outlet piping component 142 may be configured to be positioned in fluidic communication with the secondary outlet orifice 216 so as to deliver water from the air conditioning apparatus 124 to the faucet 144 for use.

Figure 5:
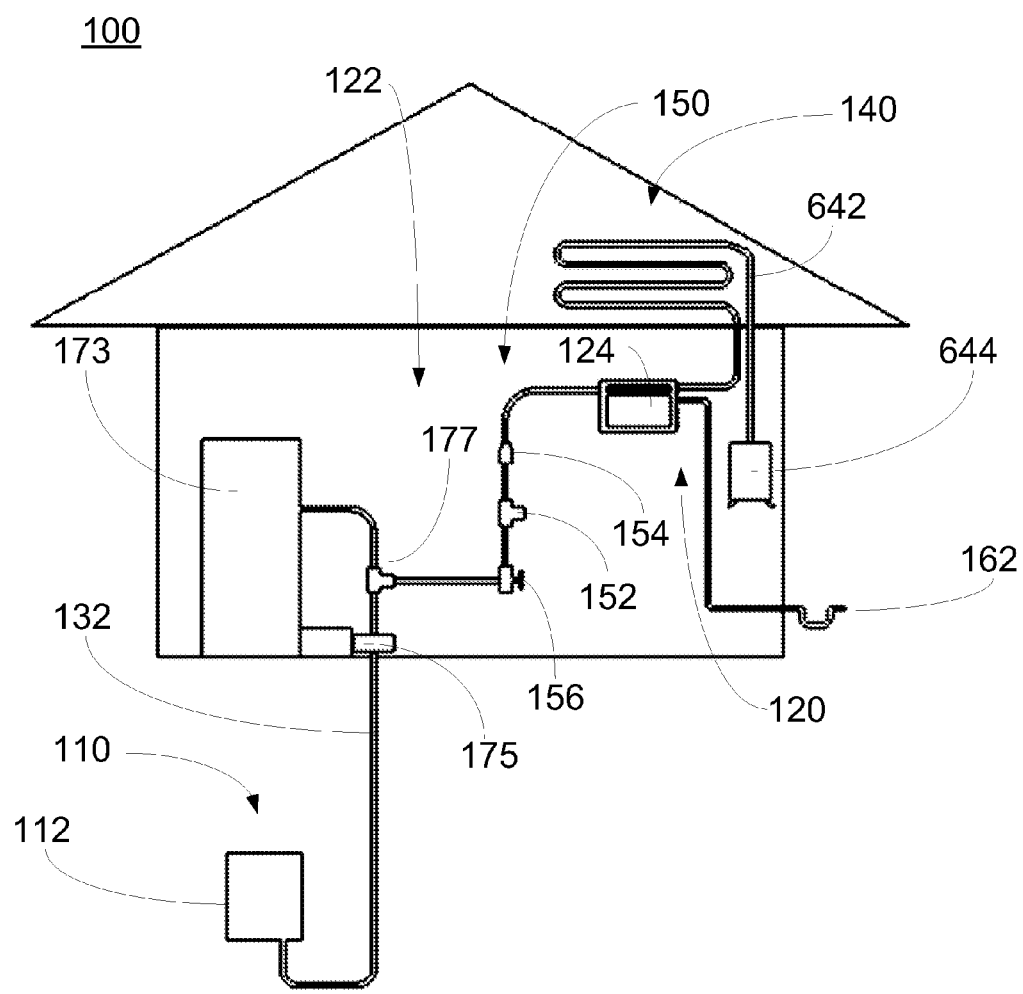
FIG. 5 is a schematic block diagram of a ground water air conditioning system configured for cooling and heating according to an embodiment of the present invention.

Referring now to FIG. 5, another embodiment of the invention is presented. As in the present embodiment, the plumbing subsystem 150 may include a secondary outlet piping component 642 that is routed through an area external the air chamber 122, in an area that is generally not cooled by the cooling system 100. Moreover, in some embodiments, the secondary outlet piping component may be routed through an area that has an ambient temperature that is approximately equal to or greater than the temperature of water being discharged by the air conditioning apparatus so as to further increase the temperature of the discharged water. Furthermore, the secondary outlet piping component 642 may be positioned in fluidic communication with a warm water tank 644 that is configured to store the water that flows through the secondary outlet piping component 642 for subsequent use by a user. Such a use may include routing the warmed water through a baseboard heater system.

Figure 6:
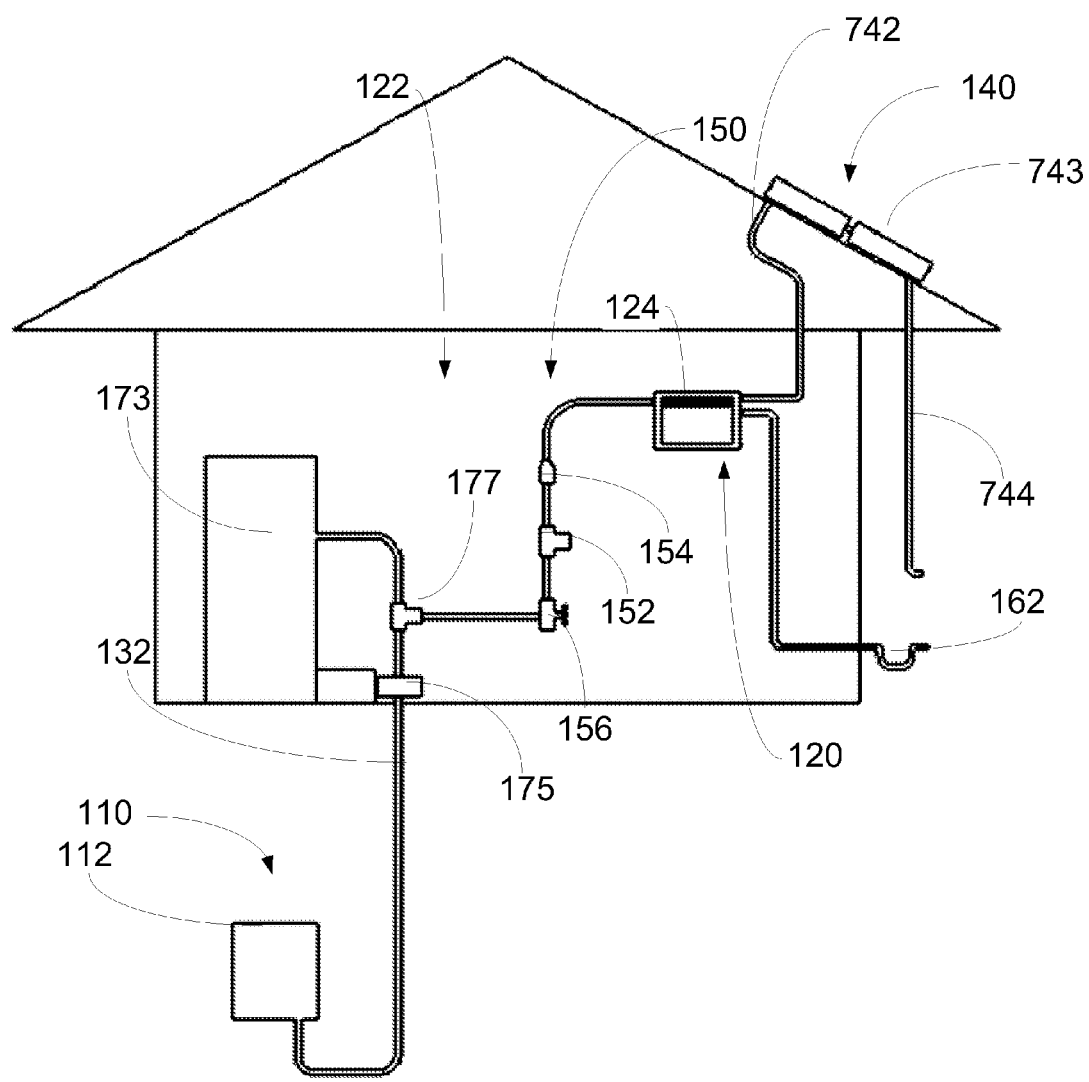
FIG. 6 is a schematic block diagram of a ground water air conditioning system configured for cooling and heating according to an embodiment of the present invention.
Figure 7:
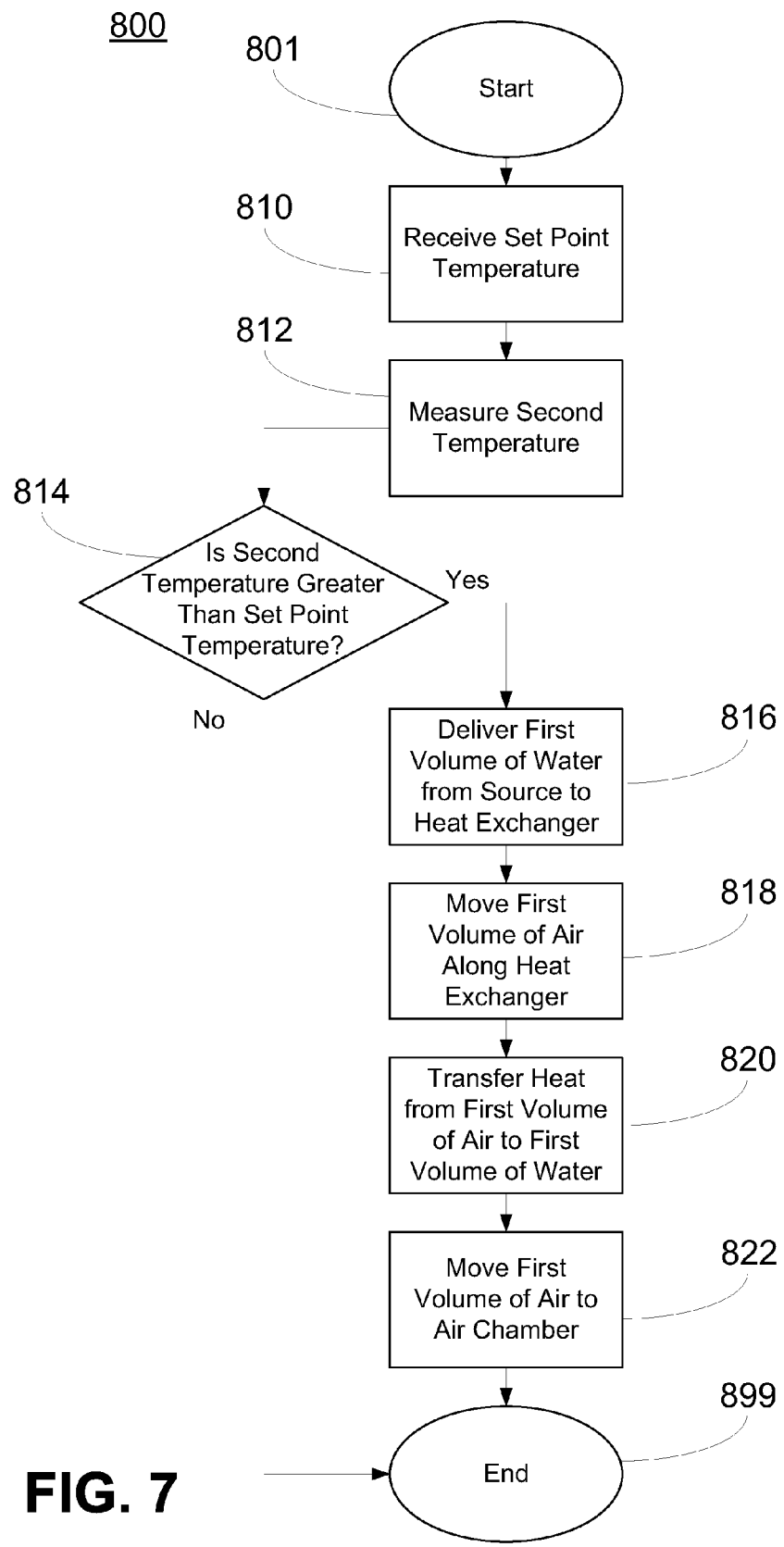
FIG. 7 is a diagram depicting a flowchart illustrating a method according to an embodiment of the invention.

Referring now to FIG. 6, another embodiment of the invention is presented. As in the present embodiment, the plumbing subsystem 150 may include a secondary outlet piping component 742 that is routed to a solar heating system 743 as is known in the art for utilizing solar energy for heating water. Once routed through the solar heating system 743, the water may be routed through a secondary discharge component 744 for use by a user for any desired use. Such use may include for providing heated water to a swimming pool.

Figure 8:
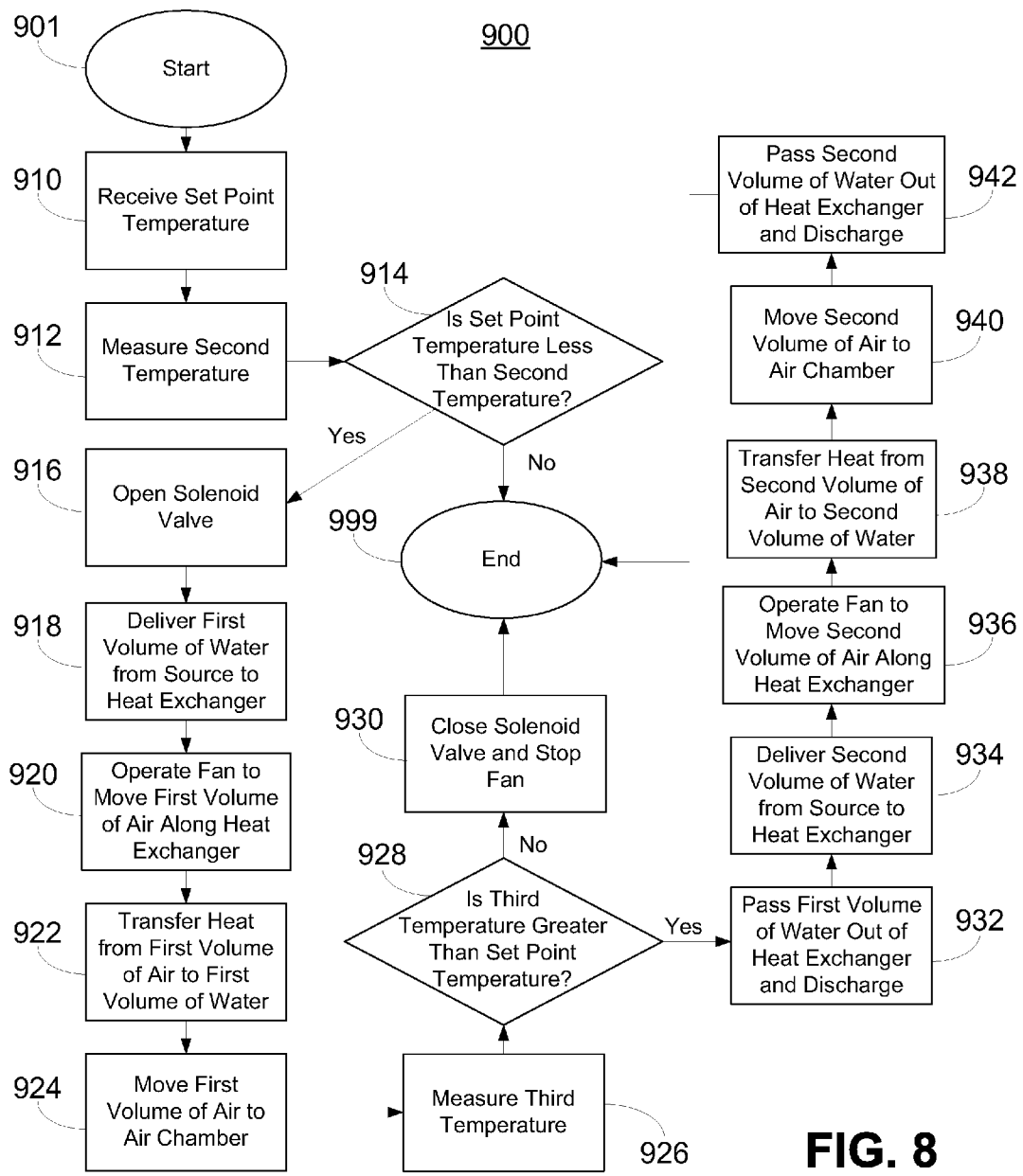
FIG. 8 is a diagram depicting a flowchart illustrating a method according to an embodiment of the invention.

Referring now to FIG. 8, a method 800 according to an embodiment of the invention is presented. Starting at Block 801, the method 800 may include receiving a set point temperature at Block 810. The set point temperature may be received by any method, including from a thermostat, as described hereinabove. Next, at Block 812, a second temperature of air contained within an air chamber may be measured. The second temperature may be measured by any method, including by operating a temperature sensor as described hereinabove.

At Block 814, the set point temperature may be compared to the second temperature. The comparison may be performed by a control circuit as described hereinabove. Furthermore, the control circuit may determine if the set point temperature is less than the second temperature. If the set point temperature is not less than the second temperature, then the method may terminate at Block 899. If, however, the set point temperature is less than the second temperature, the method may continue at Block 816 where a first volume of water may be delivered to a heat exchanger. The first volume of water may be drawn from a cool water source and may have a first temperature. Moreover, the water may be delivered using an inlet piping component as described hereinabove. Additionally, at Block 816, the first volume of water may be passed through an inlet orifice of the heat exchanger and along an interior surface of a tube thereof.

At Block 818, a first volume of air may be moved from an air chamber along the heat exchanger. The air may be moved by a fan, as described hereinabove, which may be controlled by the control circuit. Moreover, the air may be moved across a heat sink of the heat exchanger, increasing the thermal transmission rate thereof.

At Block 820, heat may be transferred from the first volume of air to the first volume of water through the heat exchanger. Such a transfer of heat may alter the first volume of air to exhibit a first-cycle conditioned temperature that is less than the second temperature. Moreover, the first volume of water may be altered to exhibit a first-cycle altered temperature that is greater than the first temperature and approximately equals the first-cycle conditioned temperature. In some embodiments, the first-cycle altered temperature may be less than the first-cycle conditioned temperature.

At Block 822, the first volume of air, which now has a first-cycle conditioned temperature, may be moved to the air chamber. Such movement may be accomplished by operation of the fan. More specifically, such movement may be accomplished by the fan establishing a flow of air that results in the displacement of the first volume of air away from the heat exchanger and through an air output section. The method may then end at Block 899.

Referring now to FIG. 9, a method 900 according to another embodiment of the invention is presented. The method 900 may include steps similar to those of method 800. Starting at Block 901, the method 900 may include receiving a set point temperature at Block 910. The set point temperature may be received by any method, including from a thermostat, as described hereinabove. Next, at Block 912, a second temperature of air contained within an air chamber may be measured. The second temperature may be measured by any method, including by operating a temperature sensor as described hereinabove.

At Block 914, the set point temperature may be compared to the second temperature. The comparison may be performed by a control circuit as described hereinabove. Furthermore, the control circuit may determine if the set point temperature is less than the second temperature. If the set point temperature is not less than the second temperature, then the method may terminate at Block 999. If, however, the set point temperature is less than the second temperature, the method may continue at Block 916 where a solenoid valve of the inlet piping component is opened so as to allow fluid to flow past. Opening the valve may enable Block 918, where a first volume of water may be delivered to a heat exchanger. The first volume of water may be drawn from a cool water source and may have a first temperature. Moreover, the water may be delivered using an inlet piping component as described hereinabove. Additionally, at Block 816, the first volume of water may be passed through an inlet orifice of the heat exchanger and along an interior surface of a tube thereof.

In some embodiments, the first volume of water may be prevented from being delivered by using a shutoff valve to prevent water from flowing through the solenoid valve. Accordingly, the shut off valve may be operated to selectively stop the first volume of water from passing to the solenoid valve.

At Block 920 a first volume of air may be moved from an air chamber along the heat exchanger. The air may be moved by operating a fan, as described hereinabove, which may be controlled by the control circuit. Moreover, the air may be moved across a heat sink of the heat exchanger, increasing the thermal transmission rate thereof.

At Block 922, heat may be transferred from the first volume of air to the first volume of water through the heat exchanger. Such a transfer of heat may alter the first volume of air to exhibit a first-cycle conditioned temperature that is less than the second temperature. Moreover, the first volume of water may be altered to exhibit a first-cycle altered temperature that is greater than the first temperature and approximately equals the first-cycle conditioned temperature. In some embodiments, the first cycle altered temperature may be less than the first-cycle conditioned temperature.

At Block 924, the first volume of air, which now has a first-cycle conditioned temperature, may be moved to the air chamber. Such movement may be accomplished by operation of the fan. More specifically, such movement may be accomplished by the fan establishing a flow of air that results in the displacement of the first volume of air away from the heat exchanger and through an air output section.

At Block 926, a third temperature of air contained within an air chamber may be measured. The measurement of the third temperature may be contemporaneous with the movement of the first volume of air into the air chamber, or at a period shortly thereafter. At Block 928, the set point temperature may be compared to the third temperature. The comparison may be performed by a control circuit as described hereinabove. Furthermore, the control circuit may determine if the set point temperature is less than the third temperature. If the set point temperature is not less than the third temperature, then the method may continue at Block 930 where the control circuit may close the solenoid valve and stop the operation of the fan. The solenoid valve may be closed responsive to a signal from the control circuit, and the operation of the fan may be stopped responsive to a signal received from the control circuit. The method may then end at Block 999.

If, however, the set point temperature is less than the second temperature, the method may continue at Block 932 where the first volume of water may be passed out of the heat exchanger and discharged. More specifically, the first volume of water may be passed along an interior surface of a tube of the heat exchanger and through an outlet orifice. Furthermore, the first volume of water may be discharged using an outlet piping component in fluidic communication with the outlet orifice.

The method may continue at Block 934 where a second volume of water may be delivered from the cool water source to the heat exchanger using the inlet piping component and passing the second volume of water through the inlet orifice and along the interior surface of the tube of the heat exchanger. At Block 936, a second volume of air may be moved from the air chamber along the heat exchanger using the fan. More specifically, the second volume of air may be moved across the heat sink of the heat exchanger.

At Block 938, heat may be transferred from the second volume of air to the second volume of water through the heat exchanger. Such a transfer of heat may alter the second volume of air to exhibit a second-cycle conditioned temperature that is less than the third temperature. Moreover, the second volume of water may be altered to exhibit a second-cycle altered temperature that is greater than the first temperature and approximately equals the second-cycle conditioned temperature. In some embodiments, the second-cycle altered temperature may be less than the second-cycle conditioned temperature At Block 940, the second volume of air, which now has a second-cycle conditioned temperature, may be moved to the air chamber. Such movement may be accomplished by operation of the fan. More specifically, such movement may be accomplished by the fan establishing a flow of air that results in the displacement of the first volume of air away from the heat exchanger and through an air output section. Additionally, at Block 942, second volume of water may be passed out of the heat exchanger and discharged through the outlet orifice and using an outlet piping component in fluidic communication with the outlet orifice as described hereinabove. The method may then end at Block 999.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A method of cooling air contained in an air chamber using a cool water source configured to hold water having a first temperature, the method comprising the steps of:
   receiving a set point temperature using a thermostat;
   measuring a second temperature of the air contained in the air chamber using a temperature sensor;
   comparing the set point temperature to the second temperature of the air in the air chamber using a control circuit in electrical communication with the temperature sensor and with the thermostat;
   detecting that the set point temperature is less than the second temperature using the control circuit;
   delivering, using an inlet piping component, a first volume of the water held by the cool water source to a heat exchanger of a liquid-to-air type having a tube that includes an inlet orifice, an outlet orifice, an interior surface, and an exterior surface, and having a heat sink in thermal communication with the exterior surface of the tube;
   passing the first volume of the water through the inlet orifice and along the interior surface of the tube of the heat exchanger, wherein the inlet piping component is in fluid communication with the inlet orifice;
   moving a first volume of the air contained by the air chamber along the heat sink of the heat exchanger using a fan that is operably coupled to the control circuit;
   transferring heat to the first volume of the water from the first volume of the air, thereby altering the first volume of the air to exhibit a first conditioned temperature that is less than the second temperature and altering the first volume of the water to exhibit a first altered temperature that is greater than the first temperature and that approximately equals the first conditioned temperature;
   moving the first volume of the air having the first conditioned temperature back into the air chamber;
   retaining at least a portion of the first volume of water from the heat exchanger with the first altered temperature in a warm water tank that is configured for warm water distribution; and
   expelling the remaining first volume of water from the heat exchanger with the first altered temperature to a location different than the original cool water source.

2. The method according to claim 1 wherein the water held by the cool water source is positioned underground at a vertical depth not less than 40 feet from ground level; wherein the cool water source is one of an underground tank and an aquifer; and wherein the first temperature is less than or equal to 55 degrees Fahrenheit.

3. The method according to claim 1 wherein delivering the first volume of the water to the heat exchanger further comprises opening a solenoid valve to allow the inlet piping component to deliver the first volume of water to the heat exchanger; wherein the solenoid valve is operably coupled to the control circuit and is located on the inlet piping component upstream of the heat exchanger and downstream of the cool water source.

4. The method according to claim 3 further comprising selectively stopping the first volume of the water from passing to the solenoid valve using a shutoff valve located on the inlet piping component upstream of the solenoid valve.

5. The method according to claim 3 wherein moving the first volume of the air further comprises operating the fan; and wherein operating the fan and operating the solenoid valve, in combination, are characterized by an energy efficiency ratio not less than 45.

6. The method according to claim 3 wherein delivering the first volume of the water to the heat exchanger further comprises adjustably regulating a rate at which the first volume of the water is allowed to pass from the solenoid valve to the heat exchanger using a water flow rate valve located on the inlet piping component upstream of the heat exchanger and downstream of the solenoid valve.

7. The method according to claim 3 further comprising:
   measuring a third temperature of the air contained in the air chamber using the temperature sensor;
   comparing the set point temperature to the third temperature using the control circuit;
   detecting whether the third temperature is equal to or less than the set point temperature using the control circuit;
   closing the solenoid valve in response to a close signal received from the control circuit; and
   stopping the at least one fan in response to a stop signal received from the control circuit.

8. The method according to claim 1 further comprising:
   measuring a third temperature of the air contained in the air chamber using the temperature sensor;
   comparing the set point temperature to the third temperature using the control circuit;
   detecting whether the third temperature is greater than the set point temperature using the control circuit;
   passing the first volume of the water along the interior surface of the tube of the heat exchanger and through the outlet orifice;
   discharging, using an outlet piping component, the first volume of the water from the tube of the heat exchanger, wherein the outlet piping component is in fluid communication with the outlet orifice;
   delivering, using the inlet piping component, a second volume of the water held by the cool water source to the heat exchanger;
   passing the second volume of the water through the inlet orifice and along the interior surface of the tube of the heat exchanger;
   moving a second volume of the air contained by the air chamber along the heat sink of the heat exchanger using the at least one fan;
   transferring heat to the second volume of the water from the second volume of the air, thereby altering the second volume of the air to exhibit a second conditioned temperature that is less than the third temperature and altering the second volume of the water to exhibit a second altered temperature that is greater than the first temperature and that approximately equals the second conditioned temperature; and
   moving the second volume of the air having the second conditioned temperature back into the air chamber.

9. The method according to claim 8 wherein discharging the first volume of the water further comprises delivering, using the outlet piping component, the first volume of the water to a location that is outside of the air chamber and is not in fluid communication with the cool water source.

10. The method according to claim 1 wherein at least a portion of the first volume of water with the first altered temperature is routed through a heated attic space before being retained in a warm water tank that is configured for warm water distribution.

\* \* \* \* \*